United States Patent [19]

Aakre et al.

[11] Patent Number: 4,956,808
[45] Date of Patent: Sep. 11, 1990

[54] REAL TIME DATA TRANSFORMATION AND TRANSMISSION OVERLAPPING DEVICE

[75] Inventors: David E. Aakre, Kasson; Roy L. Hoffman, Pine Island; David N. Moen; Quentin G. Schmierer, both of Rochester, all of Minn.

[73] Assignee: International Business Machines Corporation, Armonk, N.Y.

[21] Appl. No.: 54,111

[22] Filed: May 20, 1987

Related U.S. Application Data

[63] Continuation of Ser. No. 689,545, Jan. 7, 1985, abandoned.

[51] Int. Cl.⁵ .............................................. G06F 5/06
[52] U.S. Cl. ...................................... 364/900; 380/49
[58] Field of Search ... 364/200 MS File, 900 MS File; 358/260, 261, 261.1, 261.2, 433, 442; 381/31-33; 380/42, 49, 48, 50

[56] References Cited

U.S. PATENT DOCUMENTS

| T964,004 | 11/1977 | Davy | 358/260 |
|---|---|---|---|
| 3,268,870 | 8/1966 | Chalker, Jr. et al. | 364/900 |
| 3,490,690 | 1/1970 | Apple et al. | 341/67 |
| 3,680,055 | 7/1972 | Wilson | 364/200 |
| 3,958,081 | 5/1976 | Ehrsam et al. | 178/22.05 X |
| 4,021,782 | 5/1977 | Hoerning | 364/900 |
| 4,040,027 | 8/1977 | Van Es et al. | 364/900 |
| 4,107,775 | 8/1978 | Ott | 364/900 X |
| 4,159,517 | 6/1979 | Paradine et al. | 364/200 |
| 4,195,200 | 3/1980 | Feistel | 178/22.19 X |
| 4,228,501 | 10/1980 | Frissell | 364/200 |
| 4,258,418 | 3/1981 | Heath | 364/200 |
| 4,302,775 | 11/1981 | Widergren et al. | 358/13 X |
| 4,314,355 | 2/1982 | Leighou et al. | 364/900 |
| 4,330,844 | 5/1982 | Dubuc | 364/900 |
| 4,360,840 | 11/1982 | Wolfrum et al. | 358/261 |
| 4,386,373 | 5/1983 | Kondo et al. | 358/431 |
| 4,447,873 | 5/1984 | Price et al. | 364/200 |
| 4,467,354 | 8/1984 | Eby, Jr. et al. | 358/447 X |
| 4,491,934 | 1/1985 | Heinz | 364/900 |
| 4,541,012 | 9/1985 | Tescher | 358/135 X |
| 4,574,351 | 3/1986 | Dang et al. | 364/200 |
| 4,586,088 | 4/1986 | Kondo | 358/257 |
| 4,588,991 | 5/1986 | Atalla | 178/22.09 X |
| 4,597,057 | 6/1986 | Snow | 364/900 |
| 4,599,689 | 7/1986 | Berman | 364/200 |
| 4,602,331 | 7/1986 | Sheth | 364/200 |
| 4,641,263 | 2/1987 | Perlman et al. | 364/900 |
| 4,673,987 | 6/1987 | Toyokawa | 358/260 |
| 4,680,647 | 7/1987 | Moriyama | 360/19.1 X |

OTHER PUBLICATIONS

IBM Technical Disclosure Bulletin, vol. 22, No. 9, pp. 4194-4195, Feb. 1980, "Use of a Single Microprocessor for DASD-Tape Streaming Through Two Channels."
Skov, R. A. and Newman, E. G., "Buffer System," IBM Technical Disclosure Bulletin, vol. 2, No. 5, Feb. 1960, pp. 86-89.

Primary Examiner—David L. Clark
Attorney, Agent, or Firm—Bradley A. Forrest

[57] ABSTRACT

A real time data transformation and transmission apparatus transforms data from a first data device and transfers the transformed data to a second data device which need not have a data transfer rate consistent with the first data device. Data from the first data device is divided into blocks and is compressed by a compression device and written into a buffer. A controller controls the buffer to transmit compressed data to the second data device as a function of the data receiving rate of the second data medium provided that the buffer contains a predetermined amount of data. While the buffer is transmitting data, the compressor is compressing further blocks of data which are being written to the buffer such that the predetermined amount of data is stored in the buffer upon completion of the buffer transmitting a block of data. This ensures that complete blocks of data are transmitted to the second data medium at the data receiving rate of the second data medium.

20 Claims, 3 Drawing Sheets

REAL TIME DATA TRANSFORMATION AND TRANSMISSION OVERLAPPING DEVICE

This is a continuation of co-pending application Ser. No. 689,545 filed on 1/7/85, now abandoned.

BACKGROUND OF THE INVENTION

1. Field of the Invention

This invention relates to data transformation and transmission, and in particular to a device for compressing data from a fast access storage device and for transmitting compressed data to a slower medium.

2. Description of the Prior Art

Compression or transformation of data usually results in an irregular flow of compressed data which is not conducive to efficient recording on magnetic tape or transmitting over communication channels with reasonable efficiency. Computers with large, volatile direct access main storage devices usually require that the data contained therein be saved on nonvolatile, removable media such as tape for archival and backup purposes. The amount of data to be stored in conjunction with the relatively slow sequential access speed of tape storage devices compared to the fast access speed of direct access storage devices has led to significant efforts to compress data and to increase the speed of tape storage devices. However, there is still a disparity in their relative speeds which is usually dealt with by first storing blocks of data from the direct access storage device into a buffer which is dedicated to providing data to tape during save operations.

In U.S. Pat. No. 4,360,840 to Wolfrum et al, data is compressed in real time as it is produced by a facsimile raster scanner and stored in a buffer for transmission. Data is not transmitted until a full page of text has been compressed and stored. While this procedure reduces the amount of buffer space required to store a page of data, it does not address the problem of transmitting the data from the buffer while it is being compressed. This can result in loss of valuable transmission time and possibly require larger storage devices to store a full page of text.

U.S. Pat. No. 3,490,690 to Apple et al relates to compression of an instruction trace and recording the compressed data to tape. Compressed data is written to tape and sections of data are dropped and not recorded when the tape gets behind or "no data" characters are recorded on the tape when the tape gets ahead. This results in lost data and does not optimize the data storage capability of the tape.

SUMMARY OF THE INVENTION

A real time data transformation and transformed data transmission device is provided which compresses data provided from a first data medium and provides the compressed data to a second data medium which accepts data at a rate slower than the rate at which the first data medium provides data. The compressed data is provided to the second data medium as required by the second data medium to operate in an efficient manner. A transformation means receives a first block of data from the first data medium and compresses the data into a corresponding block of compressed data which is preferably smaller than the uncompressed block of data. A buffer means receives the compressed data and stores blocks of compressed data for provision to the second data medium. A control means is coupled to the transformation means and to the buffer means for controlling the buffer means to provide a continuous flow of compressed data to the second data medium as a function of the data acceptance rate of the second data medium. Overlapped with the provision of compressed data to the second data medium, the control means also causes the transformation means to compress a second block of data into the buffer means as a function of the amount of usable free space in the buffer means.

In the preferred embodiment, the first data medium is a direct access storage device of a computer which periodically has its data saved onto the second medium which is a tape storage device. The tape storage device receives data at a rate compatible with constant operation of the tape storage device so that the tape need not be stopped and restarted which considerably slows the save operation. Data which is stored to the tape is compressed in accordance with a desired compression scheme to increase data density on the tape which reduces the number of tapes needed for the save operation and reduces the time required to store data on tape.

The first block of data from the direct access storage device is compressed and stored in the buffer means. Once the entire first block of data is stored in the buffer means, a write to tape operation begins. While the first block of data is being written to tape, the control means coordinates the writing to the buffer means of the second block of data. Since the data transfer rate of the direct access storage device is much greater than the data receiving rate of the tape device, the second block of data is preferably written into the buffer means before the first block of data is completely written to the tape. The second block of data is then written to tape, while a third block of data is compressed to the buffer means in whatever free space exists. The control means assures that data in the buffer is not lost while blocks are being stored and written at the same time; the control means also allocates buffer cycles between storing and writing data, with writing data to the tape having priority over the storing of compressed data from the direct access storage device.

The storing and writing of compressed blocks of data continues until all the desired data is saved on tape. The tape is run in a continuous or streaming mode unless there is not a complete block of compressed data available from the buffer means to prevent under running of the tape.

In the event that there is not a complete block of data available from the buffer means, the tape will stop in an interblock gap until a complete block is available. The storage capacity of the buffer means is chosen to be large enough to hold the largest possible block of data which has been compressed. In some instances this may be larger than the block of data to be compressed if the block of data does not lend itself to compression. With that size buffer means, and considering the data transfer rates of the direct access storage device and the tape device, and the transformation or compression characteristics of the data to be saved, the availability of a complete block of compressed data from the buffer means when required by the tape device is virtually assured.

In an alternate embodiment, data is compressed or transformed and stored in the buffer means. Coordination of the overlapping of transforming and storing data in the buffer means with writing to and from tape is based on the amount of compressed data stored in the buffer means. In this embodiment, the size of the buffer means is determined as a function of the data transfer rates of the direct access storage device and the tape device, and the transformation characteristics of the data to be saved such that transformed data is always available when requested by the tape device.

The present invention has the advantage of compressing data in real time as defined by the tape device requirements for data. This permits the data to be compressed to its limit in accordance with the selected compression technique and be written to tape as fast as the tape accepts the data. Fewer tapes are required for a save operation because the data is compressed to its limit. Because the compression and writing to tape are overlapped a desired amount as a function of the predetermined size of the blocks of data, the tape operates in a continuous or streaming mode thus reducing the time required for the save operation.

DETAILED DESCRIPTION OF THE PREFERRED EMBODIMENTS

Figure 1:
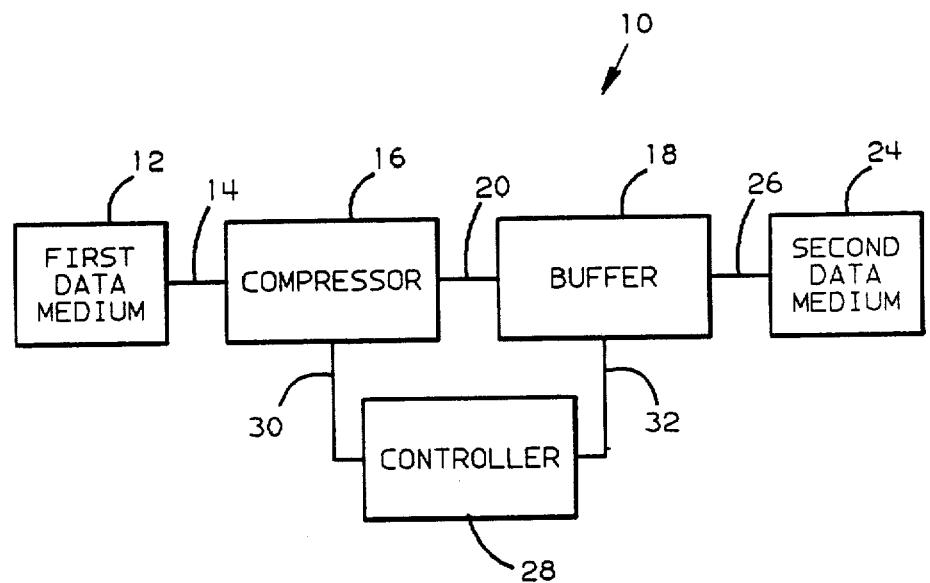
FIG. 1 is a simplified block diagram of a real time data transformation and transmission overlapping device in accordance with the present invention.

A real time data transformation and transmission device is indicated generally at 10 in FIG. 1. A first data medium 12 such as a direct access storage device of a computer is coupled by a line 14 to a data transformation means 16 (also referred to as data compressor 16) which transforms data as by compression, encryption or other forms of data transformation. The lines referred to herein comprise busses, coaxial cable, optical fibers or other appropriate communicative means. In the preferred embodiment, data compressor 16 receives a block of data from first data medium 12 and compresses the block of data by removing redundant data bytes or characters which are typically randomly scattered throughout the block of data.

Data compressor 16 provides the compressed data to a buffer 18 along a line 20. Buffer 18 comprises a dynamic random access memory and provides compressed data to a second data medium 24 on a line 26. Second data medium 24 has a data transfer rate which is usually slower than the data transfer rate of first data medium 12.

In one functional embodiment, second data medium 24 is a magnetic tape unit such as an IBM model 3430, having known start and stop times and first data medium 12 is a random access storage device such as an IBM model 3370. When a section of data contains a series of redundant bytes, a gap during which no data is provided to buffer 18 occurs. If data were written from the buffer 18 directly to the second data medium 24 as the data is being compressed, the gap would cause second data medium 24 to stop and rewind the tape to the correct point to start receiving data again.

To solve this problem, a control means or controller 28 is coupled between compressor 16 by a line 30 and buffer 18 by a line 32. Controller 28 determines when a block of data has been compressed by compressor 16 and written to buffer 18. Controller 28 then initiates the writing of that block of data to the second data medium 24 at a rate determined by second data medium 24 requests for bytes of data. While the data is being transmitted to the second data medium 24, a next block of data is compressed by compressor 16 as controlled by controller 28. The next block of data is compressed into buffer 18, which is a first in, first out data buffer, before the first block of compressed data is completely transmitted to the second data medium 24 such that the second data medium 24 operates in a streaming mode and is not required to stop and start during a block or between data blocks.

Figure 2A:
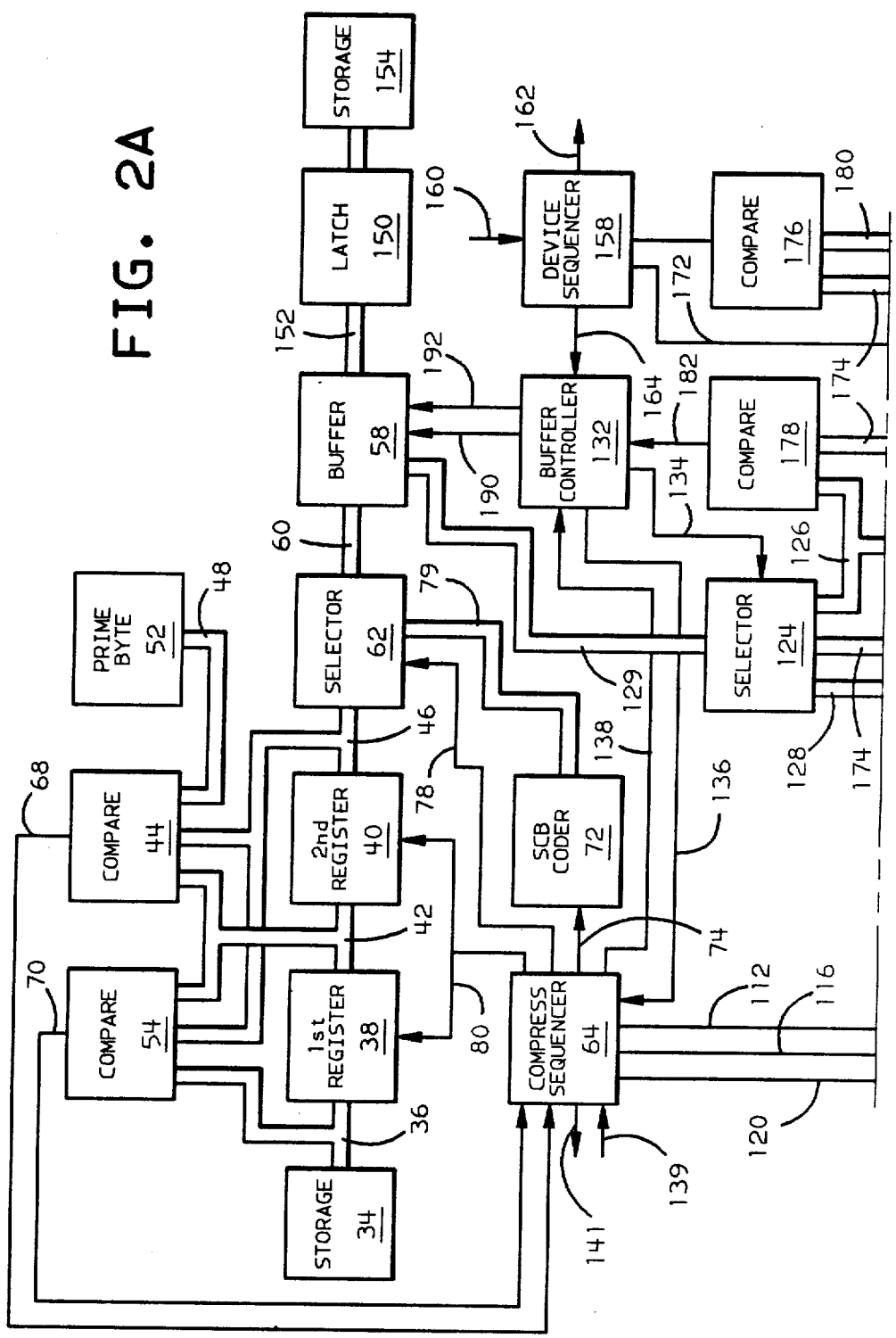
FIGS. 2A and 2B, the left side of 2A mating with the right side of 2B, are a schematic block diagram of the data transformation and transmission overlapping device of FIG. 1.
Figure 2B:
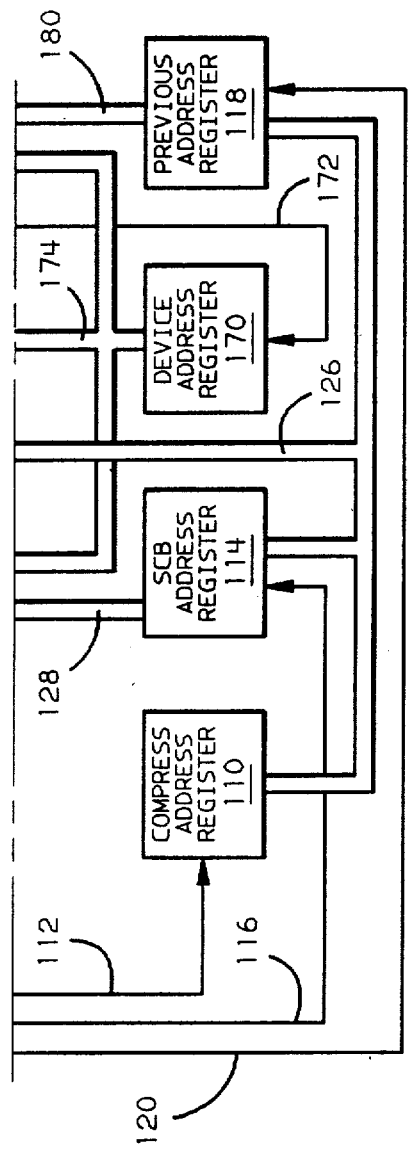

In FIGS. 2A and 2B, a hardware implementation of a Systems Network Architecture (SNA) compression algorithm used, and the apparatus of the present invention is shown. The block of data is received from a storage device 34 one byte at a time on a line 36 and is written into a first register 38 and then into a second register 40 via a line 42 while the next byte of data is written into first register 38 such that the registers contain sequential bytes of the block of data.

A first comparator 44 receives the first byte of data in second register 40 on a line 46, the second byte of data in first register 38, and a prime or preselected byte on a line 48 from a memory device 52. First comparator 44 compares the first and second bytes of data with the prime byte to determine if the data contains a series of at least two prime bytes. A second comparator 54 receives the first data byte on line 46, the second data byte on line 42 and a third data byte on line 36 to determine if there is a series of at least three identical bytes. A series of at least three identical bytes of data which are not the same as the prime byte, detected in this manner are referred to as a nonprime series. If no prime or nonprime series are detected, the condition is referred to as mixed data.

Mixed data bytes are written into a buffer 58 which is coupled by a line 60 through a selector 62 to line 46. Selector 62 is controlled by a compress sequencer 64 which receives information identifying the type of data series from first comparator 44 and second comparator 54 on lines 68 and 70 respectively. From this information, compress sequencer 64 controls formation of a string control byte (SCB) by a SCB coder 72. SCB coder 72 forms the SCB as a function of information provided from compress sequencer 64 on a line 74. The information and hence the SCB is representative of the type of series of bytes and indicates the number of bytes in the particular series of bytes it represents.

By controlling selector 62 via a line 78, compress sequencer 64 controls the content and order in which data provided to selector 62 by second register 40 via line 46 and SCBs provided to selector 62 from SCB coder 72 on a line 79, are written into buffer 58. In the case of a prime series, the SCB is not followed by data bytes because the prime byte is predefined in memory device 52. An SCB indicating a nonprime series is followed by a data byte of the repeated character. An SCB indicating mixed data is followed by all bytes of the mixed data.

Using the above SNA compression scheme, data is usually compressed more than 50 percent. In the preferred embodiment, an SCB is a byte of data having 2 bits defining the type of series it represents, and 6 bits which represent the number of bytes of data in the series up to 63. Buffer 58 is capable of storing 32,768 bytes. If a block is all mixed data, the data will expand by one byte, the SCB, for each 63 bytes of data. Therefore, the size of a block of data to be compressed was predetermined to be 32,256 bytes so that it will always fit in buffer 58 when compressed.

Use of other compression or encryption routines is within the scope of the present invention. The particular routine described above is implemented in hardware to obtain a desired high speed of compression.

Compress sequencer 64 is coupled to first register 38 and second register 40 by a line 80 to shift data from line 36 into first register 38 and to shift data from first register 38 to second register 40. Compress sequencer 64 also indicates to a compress address register 110 in FIG. 2B by a line 112, the correct buffer 58 address for data to be written into. Compress sequencer 64 is coupled to a SCB address register 114 by a line 116 and to a previous address register 118 by a line 120. SCB address register 114 contains the buffer 58 address for the SCB indicating the type of data run it precedes.

SCBs are written to buffer 58 at a time after a run of mixed data occurs because the SCB indicates the length of the run which is not known until the run of mixed data is finished. However, the address of the SCB precedes the data whether it is mixed or nonprime. Previous address register 118 contains the address of the last byte of the last previously compressed block in buffer 58. An address selector 124 which is coupled to compress address register 110 and SCB address register 114 by lines 126 and 128 respectively provides buffer 58 with the appropriate address for data and SCBs on a line 129 as they are written into buffer 58. SCB address register 114 receives an address from compress address register 110 on line 126 when initiated by compress sequencer 64 on line 116.

A buffer controller 132 is coupled to address selector 124 by a line 134 and initiates selection and provision of the address to buffer 58 by address selector 124. Buffer controller 132 is coupled to compress sequencer 64 by lines 136 and 138. Buffer controller 132 grants a buffer cycle to compress sequencer 64 on line 136, and compress sequencer 64 indicates on line 138 that a byte of data or a SCB is available to be written to buffer 58 and the buffer address has been updated. In this manner, a block of data is compressed and written to buffer 58.

Once a complete block of compressed data is available from buffer 58, the block is transmitted to a set of latches 150 over a line 152. The availability of a complete block of compressed data is indicated by a finished block line 139, which is set responsive to a complete block of data having been transferred from data storage device 34 to first register 38. Finished block line 139 is coupled to compress sequencer 64 which initiates transmission of the compressed block of data. Compress sequencer 64 is also coupled to storage medium 34 by a line 141 to initiate transfer of data from storage medium 34 to first register 38.

The second data medium indicated at 154 receives the compressed data from latches 150 at the rate required by second data medium 154. A device sequencer 158 is coupled to second data medium 154 by lines 160 and 162. Line 160 provides requests for bytes of data from second data medium 154. Line 162 provides an indication to second data medium 154 that a compressed block of data has been provided to second data medium 154.

Device sequencer 158 is also coupled to buffer control 132 by line 164 which provides requests for a buffer 58 cycle from second data medium 154. Device sequencer 158 increments a device address register 170 over a line 172 such that the device address register 170 contains the address of the byte to be written to latches 150 from buffer 58. The device address indicated by device address register 170 is provided by a line 174 to selector 124 for provision to buffer 58.

The device address is also provided to a previous address comparator 176 and a compress address comparator 178 by line 174. The previous address comparator 176 compares the device address to the previous address indicating the address of the last byte of the latest block of data completely written to buffer 58. The previous address is provided to the previous address comparator 176 by the previous address register 118 on a line 180. The previous address is not inserted into previous address register 118 until a complete block is written to buffer 58.

When a comparison is indicated on a line 182 which is coupled to device sequencer 158, device sequencer 158 stops the transmission of compressed data from buffer 58 to second data medium 154 because a complete block of data has been transmitted. The previous address is not changed before a block is completely transmitted to second data medium 154. A desired interblock gap is then established on second data medium 154 while the previous address is changed and the next block of compressed data is transmitted without interruption of the operation of second data medium 154. Thus, second data medium 154 can operate efficiently in a streaming or a start stop mode.

Compress address comparator 178 is coupled to line 126 to receive the address contained in compress address register 110 which indicates the present address of the buffer 58 that data is being written into. An address in device address register 170 equal to an address in compress address register 110 indicates that data is available to be written into buffer 58, but that previously compressed data from that address has not yet been transmitted to second data medium 154. Compress address comparator 178 is coupled by a line 182 to buffer control 132 to prevent the grant of a buffer cycle to compress sequencer 64 and thus ensure that data is not written to buffer 58 until data having the same address is transmitted to second data medium 154.

In a further preferred embodiment, previous address register 118 is loaded with a buffer 58 address at which compressed data is stored which is a desired number of bytes from the byte currently being written to second data medium 154. The number of bytes is predetermined as a function of the relative data transfer rates of storage device 34 and second data medium 154 together with the predicted transformation characteristics of the data in storage device 34. This permits data to be arranged in other than compressed blocks of a size defined by the compressibility of the data. Since the address in previous address register 118 is changing as data is being written to second data medium 154, second data medium 154 arranges the data to best suit its characteristics. Interblock gaps are inserted by second data medium 154 where and if desired.

In yet a further preferred embodiment, the second data medium 154 comprises an interface to a communication system such as a packet switching system. In this embodiment, buffer 58 provides compressed packets to second data medium 154 as a function of the transmission bandwidth of the second data medium. Buffer 58 serves as a buffer to both the compression characteristics of the packet and access irregularities to the second data medium, thus ensuring the availability of a compressed packet for transmission.

Buffer controller 132 prioritizes access to buffer 58. Buffer 58 access is requested by device sequencer 158 on line 164, compress sequencer 64 on line 138 and a refresh controller(not shown) when buffer 58 is a dynamic memory. Highest priority is given to device sequencer 158 followed by compress sequencer 64. Lowest priority is given to refresh. If all three request access simultaneously, buffer controller 132 grants priority as described above. In doing this, it places priority on transmitting data to second data medium 154 to keep second data medium 154 operating in a continuous manner. Thus, data is saved in a minimal amount of time with the use of a minimum amount of second data medium 154, whether it be magnetic tape or transmission bandwidth.

While the invention has been shown and described with reference to preferred embodiments thereof, it will be understood by those skilled in the art that various changes in form and details may be made therein without departing from the spirit and scope of the invention.

What is claimed is:

1. Real time data transformation and transmission apparatus for overlapping transformation of blocks of data provided from a first data medium which has a selected data transfer rate and transmission of the transformed blocks of data to a second data medium which has a selected data receiving rate, said apparatus comprising:
    transformation means coupled to the first data medium for transforming blocks of data received from the first data medium into variable size blocks of transformed data and providing said transformed data of an irregular rate;
    buffer means coupled to the transformation means and to the second data medium for storing the transformed data and transmitting the transformed data to the second data medium; and
    control means coupled to the transformation means and to the buffer means for controlling the transformation means to provide transformed data to the buffer means as a function of the amount of data in the buffer means and controlling the buffer means to transmit the transformed data to the second data medium as a function of the data receiving rate of the seond data medium provided that the buffer means contains a predetermined amount of data sufficient to ensure that each block of transformed data is transmitted to the second data medium continuously at the data receiving rate of the second data medium.

2. The apparatus of claim 1 wherein the predetermined amount of data comprises a block containing a selected number of bytes of transformed data.

3. The apparatus of claim 1 wherein the predetermined amount of data comprises a block containing a selected number of bytes of data from the first data medium prior to transformation, and wherein the control means controls the buffer means such that a complete block of data is compressed into the buffer means before transmission of the transformed data to the second data medium is initiated by the control means.

4. The apparatus of claim 1 wherein the predetermined amount of data is equal to blocks of data of a selected size and the control means controls the buffer means such that a complete block of data is transformed and stored into the buffer means by the transformation means before transmission of the transformed data to the second data medium is initiated by the control means.

5. The apparatus of claim 1 wherein the control means controls the amount of data stored in the buffer means to be at least equal to a predetermined amount of data such that the second data medium receives transformed data at a substantially continuous rate.

6. The apparatus of claim 1 wherein the second data medium comprises a magnetic tape device operating in a streaming mode.

7. The apparatus of claim 1 wherein the data transfer rate of the first data medium is substantially greater than the data transfer rate of the tape device.

8. The apparatus of claim 1 wherein the second data medium comprises a magnetic tape device operating in a start/stop mode.

9. The apparatus of claim 1 wherein the transformation means comprises a data compression means for compressing the data from the first data medium.

10. The apparatus of claim 1 wherein the data comprises blocks of characters, said data compression means compressing the blocks of characters as a function of redundant sequential bytes of data.

11. The apparatus of claim 1 wherein the transformation means comprises a data encryption means for encrypting the data from the first data medium.

12. The apparatus of claim 11 wherein the transformation means compresses data at a rate which is greater than the data receiving rate of the second data medium.

13. The apparatus of claim 1 wherein the buffer means comprises a first in, first out buffer which receives transformed data from the transformation means and provides the data to the second data medium as requested by the second data medium for substantially continuous operation of the second data medium.

14. Real time data compression and transmission apparatus for overlapping compression of blocks of data provided at a first data transfer rate and transmission of the compressed data to a data medium which has a second, lower, data transfer rate, said apparatus comprising:
    compression means for receiving the blocks of data at said first transfer rate and compressing said received data into variable size blocks of compressed data;
    buffer means coupled to said compression means and to the data medium for storing the blocks of compressed data and transmitting the compressed data to said data medium;
    control means coupled to the compression means and to the buffer means for controlling the compression means to provide compressed data to the buffer means as a function of the amount of data in said buffer means and controlling the buffer means to transmit the compressed data to the data medium at said second transfer rate; and
    end of block detection means coupled to said buffer means for providing a signal to said control means indicating an end of a variable size block of compressed data said control means being responsive to said signal to terminate transmission unless said signal indicates that a complete, additional, block of compressed data is stored in said buffer.

15. The real time data compression and transmission apparatus of claim 14 wherein the data medium comprises a tape storage device, and the control means coordinates compression and transmission of blocks of data in a manner such that the tape storage device efficiently stores the blocks of compressed data.

16. The real time data compression and transmission apparatus of claim 14 and further comprising a memory coupled to the compression means for storing blocks of data to be compressed, said first memory having a high data transfer rate in comparison to the second medium.

17. The real time data compression and transmission apparatus of claim 16 wherein the compression means is a hardwired compressor, and supplies blocks of compressed data at substantially the same rate as blocks of data to be compressed are supplied to the compression means from the memory.

18. The real time data compression and transmission apparatus of claim 14 wherein the control means initiates compression of a further block of data upon detection of an end of a block of compressed data during transmission of compressed data to the data medium.

19. Real time data compression and transmission apparatus for overlapping compression of blocks of data provided at a first data transfer rate and transmission of the compressed data to a tape drive device which has a second, lower, data transfer rate, said apparatus comprising:

a random access memory which stores blocks of data to be compressed, said memory providing the blocks of data at the first data transfer rate which is high in comparison to the second data transfer rate of the tape drive device;

a hardwired data compressor coupled to the random access memory for receiving the blocks of data at said first transfer rate and compressing said received data as it is received into variable size blocks of compressed data;

buffer means coupled to said data compressor and to the tape drive device for storing the variable size blocks of compressed data and transmitting the compressed data and transmitting the compressed data to said tape drive device for recording on the tape;

control means coupled to the random access memory and to the buffer means for controlling the random access memory to provide data to the data compressor and hence to the means and controlling the buffer means to transmit the compressed data to the tape drive device at said second transfer rate; and end of block detection means coupled to said buffer means for providing a signal to said control means indicating an end of a variable size block of compressed data, said control means being responsive to said signal to terminate transmission unless said signal indicates that a complete, additional, block of compressed data is stored in said buffer.

20. The apparatus of claim 19 and further comprising, latch means coupled between the buffer means and the tape drive device for latching data being transfered from the buffer means to the tape drive device so that data is available from the latch means when required by the tape drive device.

* * * * *